US006934525B1

(12) United States Patent
Dunlop et al.

(10) Patent No.: US 6,934,525 B1
(45) Date of Patent: Aug. 23, 2005

(54) MOBILE COMMUNICATIONS NETWORK

(75) Inventors: John Dunlop, Glasgow (GB); James Menzies Irvine, Troon (GB); Demessie Girma, Glasgow (GB); Gwenael Le Bodic, Glasgow (GB)

(73) Assignee: University of Strathclyde, Glasgow (GB)

( * ) Notice: Subject to any disclaimer, the term of this patent is extended or adjusted under 35 U.S.C. 154(b) by 0 days.

(21) Appl. No.: 09/936,144

(22) PCT Filed: Mar. 7, 2000

(86) PCT No.: PCT/GB00/00816

§ 371 (c)(1),
(2), (4) Date: Dec. 14, 2001

(87) PCT Pub. No.: WO00/54527

PCT Pub. Date: Sep. 14, 2000

(30) Foreign Application Priority Data

Mar. 10, 1999 (GB) .................................. 9905372

(51) Int. Cl.[7] ............................................. H04Q 7/20
(52) U.S. Cl. .................. 455/403; 455/426.1; 455/453; 455/560; 370/438; 370/524
(58) Field of Search ............................. 455/403, 422.1, 455/444–445, 449, 453, 426.1, 560; 370/438, 370/440, 524

(56) References Cited

U.S. PATENT DOCUMENTS 5,442,682 A * 8/1995 Svedin et al. ............. 455/435.2
5,537,411 A * 7/1996 Plas ............................ 370/397
5,548,806 A * 8/1996 Yamaguchi et al. ......... 455/441
5,550,898 A   8/1996 Abbasi et al.
5,894,474 A * 4/1999 Maison et al. .............. 370/347
6,212,389 B1 * 4/2001 Fapojuwo .................... 455/453
6,226,515 B1 * 5/2001 Pauli et al. ............... 455/426.1
6,226,518 B1 * 5/2001 An ............................ 455/449
6,529,734 B1 * 3/2003 Lagneborg et al. ....... 455/452.2

FOREIGN PATENT DOCUMENTS

EP      0 766 427 A2    4/1997

OTHER PUBLICATIONS

Copy of International Search Report for PCT/GB00/00816, completed Jun. 8, 2000.
Kyung Su Park and dong Ho Cho; A Study on the Effective Interconnection Method between Base Stations and Selector Bank Subsystem in CDMA Cellular Networks; IEICE Transactions on Communications; Aug. 1995; pp. 1145-1151; vol. E78-B, no. 8; (XP00539749).

* cited by examiner

Primary Examiner—William Trost
Assistant Examiner—Brandon J. Miller
(74) Attorney, Agent, or Firm—Alston & Bird LLP

(57) ABSTRACT

A mobile communications network (20) comprises a local exchange (24) or mobile switching center effectively connected to a plurality of cell site switches (22), each cell site switch (22) being effectively connected to a cluster (14) of base station transceivers (13). The connection between each cell site switch (22) and the respective cluster (14) is formed by a common bus (21) to which each base station transceiver (13) in the cluster and the pertaining cell site switch (22) is directly connected.

5 Claims, 2 Drawing Sheets

MOBILE COMMUNICATIONS NETWORK

FIELD OF THE INVENTION

The present invention relates to mobile communications networks and in particular to network architectures.

BACKGROUND OF THE INVENTION

A typical mobile communications network architecture comprises a mobile switching centre which is connected to the public switched telephone network (PSTN), the mobile switching centre being connected individually to several base station controllers each of which is connected individually to several base station transceivers. Each base station transceiver is capable of radio communication with mobile communications users within a specific area known as a cell. Cells are normally grouped in clusters and the radio resources allocated to each cell within a cluster are fixed, this is known as fixed channel allocation. In high user density areas cells have a geographically small radio footprint and may be overlaid by a larger umbrella cell which is appropriate for high mobility users. Resources allocated to the umbrella cell are unavailable to the smaller cells which it overlays. In this architecture resource allocation and all the signalling associated with allocating resources is handled centrally by the mobile switching centre.

As demand for mobile communications increases the trend in network architecture is towards employing increased numbers of smaller cells known as micro cells (or pico cells) together with a macro cell with a base station transceiver having a geographically large radio footprint which overlaps the collective radio footprints of the micro cell base station transceivers. This allows low mobility users such as pedestrians to be allocated to micro (or pico) base station transceivers while high mobility vehicular users are allocated to the macrocell base station transceivers. In this case radio resources allocated to individual cells in a cluster are no longer fixed but may be allocated in a dynamic fashion based on allowable levels of interference to surrounding cells, this is known as dynamic channel allocation. This requires measurement of interference levels on the air interface by mobiles and base station transceivers and negotiation for available resources between individual base station transceivers within a cluster. However, this has a number of disadvantages namely:

Because mobile stations contend for resources over the air interfaces there is an increased load on the radio channels due to the dynamic nature of resource allocation and the need to update interference measurements frequently;

Because base station transceivers negotiate for resources in a dynamic fashion this adds significant signalling load to the traditional network architecture.

It is an object of the present invention to provide a mobile communications network which obviates or mitigates the forementioned disadvantages.

It is a further object of at least one embodiment of the present invention to provide a mobile communications network which produces a fast broadcast signalling path between base station transceivers and which does not require use of the air interface.

SUMMARY OF THE INVENTION

This is achieved by integrating each cluster of micro cell base station transceivers and the associated macro base station transceiver using a common bus structure.

According to the present invention there is provided a mobile communications network comprising a local exchange or mobile switching centre effectively connected to a plurality of cell site switches, each cell site switch being effectively connected to a cluster of base station transceivers wherein the connection between each cell site switch and the respective cluster is formed by a common bus to which each base station transceiver in the cluster and the pertaining cell site switch is directly connected.

By virtue of the present invention the network is layered and a fast signalling path is provided per cluster between the base station transceivers of that cluster thereby permitting improved allocation of the network resources by localising appropriate parts of the network signalling traffic. Furthermore, the base station transceivers negotiate for radio resources over the fixed network, rather than as a result of measurements over the air interface, by receiving or locking radio channels by transmitting a single signalling packet when all base stations are connected to the same common bus. This reduces the overall load on the radio channel and enables base station transceiver channel allocation on acknowledged reservations rather than on interference measurements.

Preferably the connection between the local exchange or mobile switching centre and the plurality of cell site switches is formed by a further common bus to which each cell site switch and the local exchange or mobile switching centre is directly connected.

BRIEF DESCRIPTION OF THE DRAWINGS

An embodiment of the present invention will now be described by way of example with reference to accompanying drawings in which.

DETAILED DESCRIPTION OF THE PREFERRED EMBODIMENTS

Figure 1:
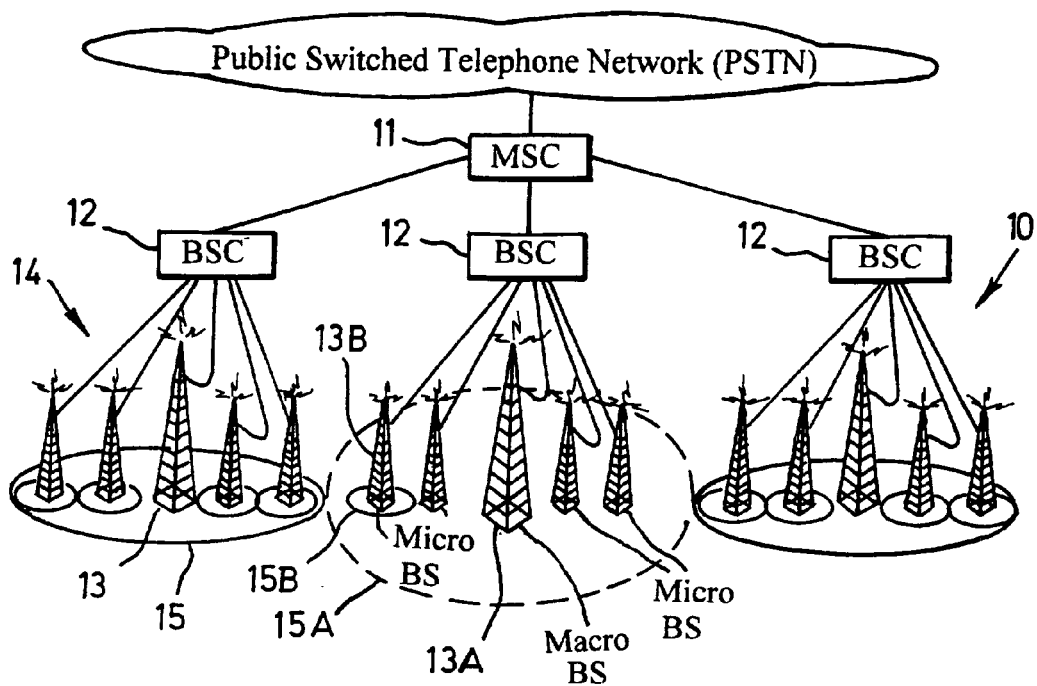
FIG. 1 illustrates a known form of mobile communications network.

As is shown in FIG. 1 a known form of mobile communications network 10 is connected to a public switched telephone network (PSTN). The network 10 includes a mobile switching centre 11 directly connected to the PSTN and directly connected individually to several base station controllers 12. Each controller 12 is directly connected to the individual base station transceivers 13 which form the cluster 14 for that controller 12. In each cluster 14 there is one macro base station transceiver 13A and several micro base station transceivers 13B. It will of course be understood that the network 10 in reality will be much larger than is illustrated but only three controllers 12 and associated clusters 14 are shown in the interests of clarity. Similarly only a small number of base stations 13 per cluster are shown in the interests of clarity. The micro base stations 13B have geographically small radio footprints denoted 15B whilst the macro base station 13A has a geographically large radio footprint denoted 15A. Each Mobile Switching Centre 11 incorporates a data base which stores information used, as will be explained, in the allocation of radio resources to mobile users.

Figure 2:
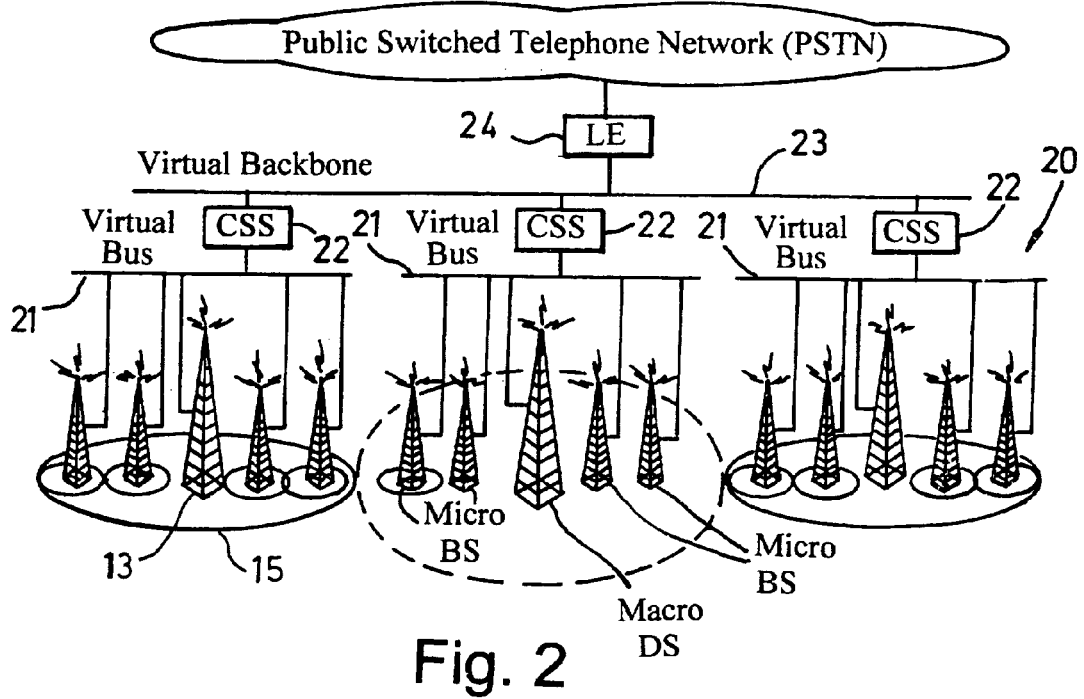
FIG. 2 illustrates a mobile communications network in accordance with the present invention.

FIG. 2 illustrates an alternative form of mobile communications network 20 which is in accordance with the present invention. In the network 20 the base station transceivers 13 with their footprints 15 are as previously described. However, in each cluster 14 each base station transceiver 13 is connected to a common bus 21 and the bus 21 in turn is connected to a cell site switch 22 which incorporates a database and which performs functions previously performed by the controller 12 and the switching centre 11. In the illustrated arrangement because there are three clusters 14, there are three buses 21 and three cell site switches 22. The cell site switches 22 are each connected to a further common bus 23 to which is also connected a local exchange 24 which performs certain functions previously performed by the mobile switching centre 11. The local exchange 24 is directly connected to the PSTN to which other local exchanges will also be connected in a large scale system.

The terms Mobile Switching Centre (MSC), Local Exchange (LE) and Cell Site switch (CSS) are generic terms in a mobile radio network and functionality will vary very significantly between one manufacturer and another. However, the terms are well understood in the mobile radio environment and it is not thought necessary to reference specific examples.

Each common bus 21 is referred to as a virtual bus being a generic transmission medium which conveniently is implemented as a local area network, for example, based on but not restricted to the IEEE standard 802.3 bus specifications. Because all of the base station transceivers 13 within a cluster 14 are interconnected by the virtual bus 21 a fast signalling path is provided between these base station transceivers irrespective of their size, and resources can be allocated dynamically between them according to demand and for a mixture of services with reduced need for radio channel measurements in comparison to those required in network 10 of FIG. 1. Accordingly the network 20 is particularly well suited to packet based communications.

The bus 23 is referred to a virtual backbone, also being a generic transmission medium but which is conveniently implemented as, but not restricted to, a distributed queue dual bus (DQDB) network based on the IEEE 802.6 specifications. Use of the virtual backbone 23 allows the localisation of signalling to specific virtual buses 21 and reduces the signalling load from the local exchange 24 in comparison to that required for the mobile switching centre 11 in the network 10 of FIG. 1.

Generally, in mobile communications networks encompassing dynamic channel allocation it is known that the traffic for resource management signalling is very much greater (orders of magnitude greater) than that for mobility management. Resource management is the dynamic assignment of communication channels whilst mobility management involves the repeated registrations and de-registrations of a mobile user sequentially over a series of base station transceivers. Both resource management and mobility management utilise information held in databases maintained in the network.

Figure 3:
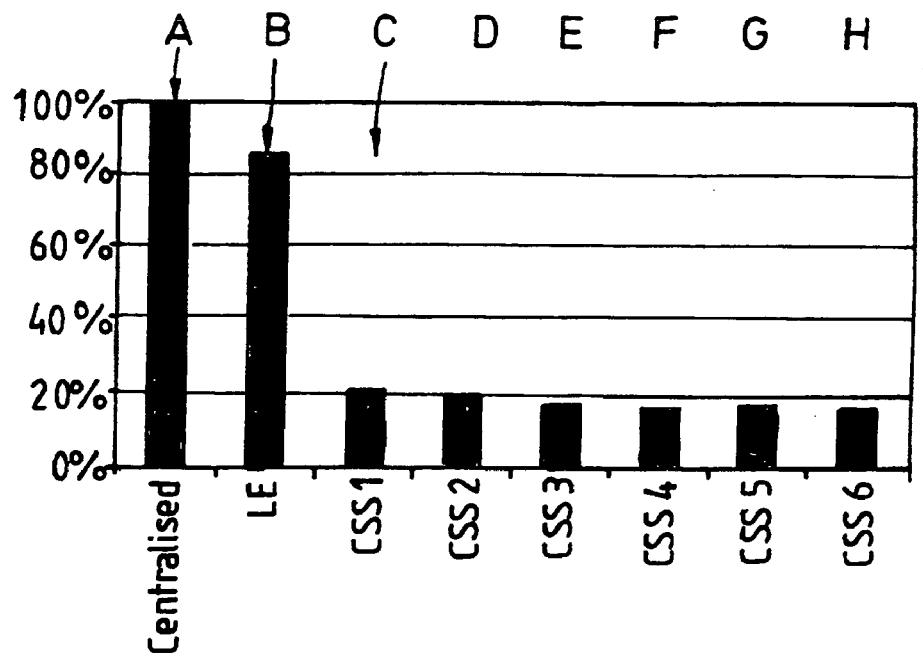
FIGS. 3 and 4 illustrates different performance characteristics for the FIG. 1 and FIG. 2 networks.

FIG. 3 illustrates database accesses for mobility management and comparing the network 10 of FIG. 1 with the network 20 of FIG. 2. Firstly for the network 10, because it is a centralised network, all accesses (i.e. 100%) go through the mobile switching centre 11 as shown at column A. Network 20, however, is not centralised and as shown at column B only about 85% of the accesses require to go through the local exchange 24 with the remainder as shown at columns C to H being confined to the cell site switches 22 (in this example there are six such switches).

In the architecture of FIG. 2 the data bases are distributed between each CSS (22) and the LE (24). Hence if a handover occurs between cells of the same grouping, signalling traffic is handled exclusively by the appropriate CSS (22). However, if handover is between cells of different groupings then two CSSs (22) and one LE (24) will be involved. Thus an overhead occurs in terms of the need to replicate signalling in two CSSs (22). Thus the total signalling appears to be more than 100%, however the LE (24) still has less signalling than the centralised equivalent MSC (11) of FIG. 1.

Figure 4:
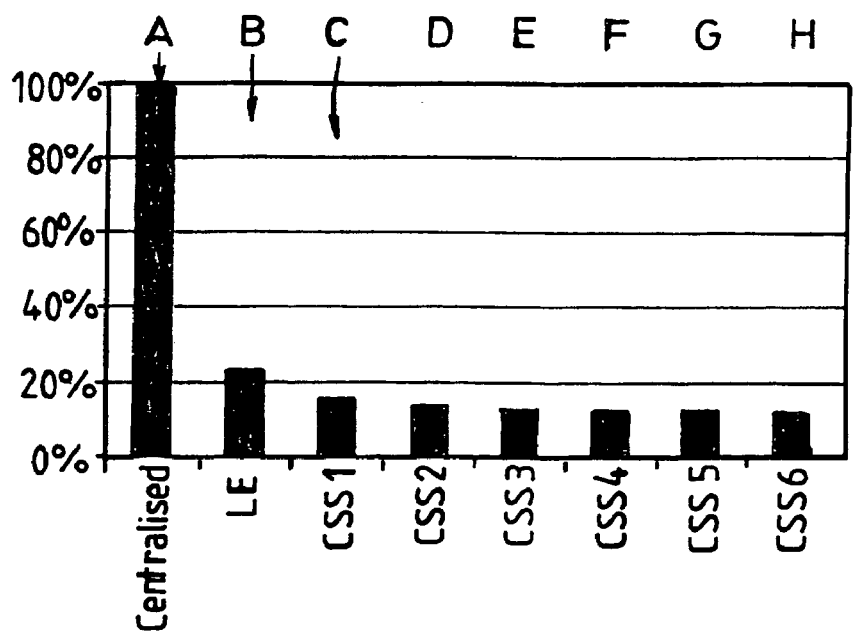

FIG. 4 illustrates the data base accesses for resource allocation in a dynamic channel allocation environment and compares the network 10 of FIG. 1 with the network 20 of FIG. 2. Again column A shows that in the centralised network 10 all accesses (i.e. 100%) go through the mobile switching centre 11 but at column B only about 24% go through the local exchange 24 of network 20 with the remainder distributed as shown at columns C to H over the six cell site switches 22 of network 20. The fact that about 76% of resource allocation signalling traffic is confined to the local buses 21 is a major advantage of the network 20.

In FIG. 4 the total signalling again appears to be more than 100% and the explanation is similar to that for FIG. 3 except that in this case a very much higher percentage of the resource allocation traffic will be localised. Only resources allocated to cells near the periphery of a grouping of cells will affect the interference levels in cells near the periphery of other groupings. Only under these circumstances will resource allocation traffic be carried by two CSSs (22) and one LE (24). The overhead is thus much less, although the total traffic can still appear to be more than 100%. In this case the traffic carried by the LE (24) is about 25% of the traffic carried by the equivalent MSC (11).

The principal advantage of the present invention is that by interconnecting the system components via a bus structure efficient network control can be implemented. In particular, the present invention:

provides a broadcast mechanism for channel allocation and adaptive control of the radio interface which does not rely on channel measurements;

enables efficient algorithm implementation for localised channel allocation in cell clusters with umbrella cell overlays;

enables the partitioning of traffic based on speed of movement of mobiles to micro cells and macro cells, thereby increasing spectral efficiency;

provides a platform for incorporation of distributed intelligence and knowledge base; and reduces the global signalling load on the network.

What is claimed is:

1. A mobile radio communications network comprising: a local exchange, or mobile switching centre, connected to a plurality of cell site switches, each cell site switch being connected to a cluster of base station transceivers, wherein one base station transceiver in each cluster acts as a macro cell and the remaining base station transceivers in each cluster act as micro cells, characterized in that (a) each of the local exchange, or mobile switching centre, and the cell site switches incorporates a data base;

(b) the connection between the local exchange, or mobile switching centre, and the plurality of cell site switches is in the form of a common bus to which each of the local exchange, or mobile switching centre, and the plurality of cell site switches is directly connected; and (c) the connection between each cell site switch and its cluster of base station transceivers is in the form of a common bus to which the pertaining cell site switch and base station transceivers are directly connected;

whereby the network forms a hierarchial system in which the bus enables localisation of signalling to specific buses thereby reducing the signalling load in the local exchange, or mobile switching centre and, in each cluster the specific bus provides a fast signalling path which enables resources to be allocated between the base station transceivers as required to maintain a desired quality of service.

2. A mobile communications network as claimed in claim 1, wherein the common bus interconnecting each cell site switch and the respective cluster is a generic transmission medium.

3. A mobile communications network as claimed in claim 2, wherein the generic transmission medium is a local area network.

4. A mobile communications network as claimed in claim 1, wherein the common bus interconnecting the cell site switches and the local exchange, or mobile switching centre, is a generic transmission medium.

5. A mobile communications network as claimed in claim 4, wherein the common bus is a distributed queue dual bus network.

* * * * *